United States Patent
Feng et al.

(10) Patent No.: US 11,991,534 B2
(45) Date of Patent: May 21, 2024

(54) SIGNAL PROCESSING METHOD AND NETWORK DEVICE

(71) Applicant: HUAWEI TECHNOLOGIES CO., LTD., Guangdong (CN)

(72) Inventors: Jie Feng, Shanghai (CN); Yiwei Hong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 176 days.

(21) Appl. No.: 17/752,308

(22) Filed: May 24, 2022

(65) Prior Publication Data
US 2022/0286869 A1 Sep. 8, 2022

Related U.S. Application Data

(63) Continuation of application No. PCT/CN2019/120672, filed on Nov. 25, 2019.

(51) Int. Cl.
*H04W 16/28* (2009.01)
*H04B 7/0456* (2017.01)
*H04B 7/06* (2006.01)
*H04W 72/0453* (2023.01)

(52) U.S. Cl.
CPC .......... *H04W 16/28* (2013.01); *H04B 7/0456* (2013.01); *H04B 7/0617* (2013.01); *H04W 72/0453* (2013.01)

(58) Field of Classification Search
CPC .............. H04W 16/28; H04W 72/0453; H04B 7/0456; H04B 7/0617; H04B 7/0697; H04B 7/0452; H04B 7/0434
See application file for complete search history.

(56) References Cited

U.S. PATENT DOCUMENTS 6,342,777 B1   1/2002   Takahashi
8,068,791 B2   11/2011  Kim
(Continued)

FOREIGN PATENT DOCUMENTS

CN   201340897 Y   11/2009
CN   101527956 B   5/2011
(Continued)

OTHER PUBLICATIONS

Extended European Search Report issued in European Application No. 19954693.8 dated Oct. 10, 2022, 10 pages.
(Continued)

*Primary Examiner* — Khanh C Tran
(74) *Attorney, Agent, or Firm* — Fish & Richardson P.C.

(57) ABSTRACT

This application provides example signal processing methods, media, and apparatuses. One example method includes obtaining a scattering parameter matrix of passive echoes in an antenna system by a network device. The m virtual user directions are determined by the network device based on the scattering parameter matrix of the passive echoes, where the m virtual user directions are m directions in which total signal strength of the passive echoes is highest, and m is a positive integer. A target beam is formed based on n real user directions and the m virtual user directions, where one or more nulls of the target beam are aligned with the m virtual user directions, n is a positive integer, and n+m≤k.

18 Claims, 11 Drawing Sheets

(56) References Cited

U.S. PATENT DOCUMENTS

| | | | |
|---|---|---|---|
| 2012/0105268 A1* | 5/2012 | Smits | G01S 13/89 342/22 |
| 2013/0114468 A1 | 5/2013 | Hui et al. | |
| 2014/0219124 A1* | 8/2014 | Chang | H04B 7/0413 370/252 |
| 2015/0022391 A1* | 1/2015 | Gumbmann | G01S 13/887 342/22 |
| 2017/0026147 A1 | 1/2017 | Smith et al. | |
| 2017/0093475 A1 | 3/2017 | Smith et al. | |
| 2017/0111155 A1 | 4/2017 | Liu et al. | |
| 2018/0152229 A1* | 5/2018 | Hafez | H01Q 21/245 |

FOREIGN PATENT DOCUMENTS

| | | |
|---|---|---|
| CN | 104793206 A | 7/2015 |
| CN | 107196684 A | 9/2017 |
| CN | 107976671 A | 5/2018 |
| CN | 110247689 A | 9/2019 |
| WO | 2013185665 A1 | 12/2013 |
| WO | 2019077122 A1 | 4/2019 |

OTHER PUBLICATIONS

PCT International Search Report and Written Opinion issued in International Application No. PCT/CN2019/120672 dated Jul. 8, 2020, 17 pages (with English translation).

\* cited by examiner

SIGNAL PROCESSING METHOD AND NETWORK DEVICE

CROSS-REFERENCE TO RELATED APPLICATIONS

This application is a continuation of International Application No. PCT/CN2019/120672, filed on Nov. 25, 2019, the disclosure of which is hereby incorporated by reference in its entirety.

TECHNICAL FIELD

This application relates to the communications field, and in particular, to a signal processing method and a network device.

BACKGROUND

With development of a 5th generation mobile communications technology (5G), a quantity of antennas in a single base station used for massive multiple input multiple output (MM) greatly increases, and even reaches 64, 128, or 256. To enable a network device to accommodate a large quantity of antennas, the antenna needs to be further integrated. However, in an antenna system, a circulator configured to eliminate an active echo in the antenna system occupies a relatively large circuit board area and volume, which hinders further integration of the antenna.

The active echo refers to a signal that is reversely led into a power amplifier (PA) of the network device when antennas are mutually coupled due to insufficient isolation between the antennas that exists when the network device sends a signal in a real user direction. If there is no circulator, the received active echo impacts the PA, resulting in a loss of efficiency of the PA.

Currently, the active echo may be canceled by transforming a circuit of the PA into a balanced circuit. For example, two PAs in a doherty (DHT) architecture are transformed into four PAs. However, after the balanced circuit is obtained through transformation, an area and costs of the antenna system are doubled as a quantity of PAs is doubled, which also hinders further integration of the antenna.

SUMMARY

Embodiments of this application provide a signal processing method and a network device, to reduce generation of an active echo.

According to a first aspect of the embodiments of this application, a signal processing method is provided. A network device first obtains a scattering parameter matrix of passive echoes in an antenna system. The antenna system includes k antennas. It should be noted that an echo (including an active echo and the passive echo) refers to a signal that is reversely ted into a PA on a channel when adjacent antennas are mutually coupled due to insufficient isolation between the antennas that exists when the network device transmits a signal. A difference is as follows: The passive echo refers to a signal that is reversely fed when antennas in the network device send signals with a same amplitude and a same phase. The scattering parameter matrix of the passive echoes is a property of each antenna system in the network device, exists when the network device is in an idle state, and does not change with served user equipment or a signal environment. The active echo refers to a signal that is reversely fed when the network device sends a signal whose amplitude and phase are determined based on a location and a requirement of the served user equipment. The active echo changes with the location and the requirement of the user equipment.

Then, the network device determines m directions in which total signal strength is highest as m virtual user directions based on the scattering parameter matrix of the passive echoes. In this case, when a target beam whose null is aligned with the m virtual user directions is formed, even if the network device sends forward signals with different amplitudes and different phases, energy of an active echo that is reversely fed is greatly decreased, and accordingly no circulator is needed in the antenna system in the network device. Therefore, the circulator may be removed to reduce a volume of the antenna system, so that the antenna system can be further integrated.

With reference to the first aspect, in a first implementation of the first aspect of the embodiments of this application, the scattering parameter matrix of the passive echoes may be represented as a matrix G with an order of k×k, a value $i^{th}$ an row and a $j^{th}$ column in the matrix G is g(i, j), and g(i, j) is equal to a signal strength ratio between a passive echo received by an antenna in an $i^{th}$ column from an antenna in the $j^{th}$ column and a signal transmitted by the antenna in the $i^{th}$ column. In this case, signal strength, in each direction, of a passive echo received by each antenna is obtained.

Specifically, signal strength of the passive echo received by the antenna is denoted as $l_{i,j}$, and $l_{i,j}$ is equal to signal strength of a passive echo that is generated by a signal sent by a $j^{th}$ antenna and that is received by an $i^{th}$ antenna.

It is assumed that k is a quantity of antennas in the network device, and a matrix L, with an order of k×k, of signal strength of passive echoes received by all the antennas is as follows:

$$L = \begin{pmatrix} l_{0,0} & l_{0,1} & \cdots & l_{0,k} \\ l_{1,0} & l_{1,1} & & l_{1,1} \\ \cdots & & \cdots & \cdots \\ l_{k,1} & l_{0,0} & \cdots & l_{1,1} \end{pmatrix}$$

After the matrix L of the signal strength of the passive echoes is determined, the scattering parameter matrix of the passive echoes may he calculated based on the matrix L. Specifically, the scattering parameter matrix of the passive echoes is the matrix G, the value in the $i^{th}$ row and the $j^{th}$ column in G is g(i, j), and g(i, j) is equal to a ratio of strength $L_{i,j}$ of the passive echo received by the antenna in the $i^{th}$ column from the antenna in the $j^{th}$ column to signal strength $s_i$ of the signal transmitted by the antenna in the $i^{th}$ column, in other words, $$g(i,j)=l_{i,j}/s_i$$

Finally, the matrix G is obtained as follows:

$$G = \begin{pmatrix} g(0,0) & g(0,1) & \cdots & g(0,k-1) \\ g(1,0) & g(1,1) & & g(1,k-1) \\ \cdots & & & \cdots \\ g(k-1,0) & g(k-1,1) & \cdots & g(k-1,k-1) \end{pmatrix}$$

In some feasible embodiments, the obtained value g(i, j) may alternatively be represented by using a complex number, in other words, $$g(i,j)=A_{i,j}*e^{i\phi_{i,j}}$$

Herein, in $A_{i,j}*e^{i\phi_{i,j}}$, $A_{i,j}$ is an amplitude, and $\phi_{i,j}$ is a phase.

With reference to the first implementation of the first aspect, in a second implementation of the first aspect of the embodiments of this application, the network device may perform dimension reduction processing on the matrix G by using a preset algorithm, to obtain a matrix V with an order of m×k. Row vectors in the matrix V are respectively v0, v1, . . . , and v(m−1), and are used to respectively represent the m virtual user directions. In this case, expressions of the m virtual user directions are obtained.

In this embodiment of this application, the matrix G is the scattering, parameter matrix of all the antennas in the antenna system, and represents the signal strength of the passive echoes received by all the antennas, and the m virtual user directions are the m directions in which the total signal strength of the passive echoes is highest. Therefore, if the remaining (k−m) directions are ignored, any row Gr in the matrix G may be approximately obtained by performing linear combination on v0, v1, . . . , and v(m−1):

$$Gr \approx q0 \times v0 + q1 \times v1 + q2 \times v2 + \ldots + q(m-1) \times v(m-1)$$

Herein, all of q0, q1, . . . , and q(m−1) are constants.

With reference to the second implementation of the first aspect, in a third implementation of the first aspect of the embodiments of this application, for the preset algorithm, the following operation may be performed: The network device performs singular value decomposition on the matrix G, to obtain $U*S*V^H$, and uses first in row vectors in $V^H$ as the matrix V, where U is a unitary matrix with an order of m×m, S is a positive semidefinite diagonal matrix with an order of m×k, and $V^H$ is a unitary matrix with an order of k×k. Any one of the obtained vectors v0, v1, . . . , and v(m−1) is a vector representing a spatial direction, and has both a length and a direction. The direction of the vector is used to represent the virtual user direction, and the length of the vector is used to represent the signal strength of the passive echo.

Singular value decomposition is mainly applied to principal component analysis (PCA) in statistics. As a data analysis method, principal component analysis is used to find out a "pattern" implied in a large amount of data. Principal component analysis may be used in pattern recognition, data compression, and the like, to map a dataset into low-dimensional space. Eigenvalues in the dataset are arranged based on importance. A dimension reduction process is a process of discarding an unimportant eigenvector, and space that includes the remaining eigenvectors is space obtained after dimension reduction.

With reference to the second implementation and the third implementation of the first aspect, in a fourth implementation of the first aspect of the embodiments of this application, the network device may determine a target spatial channel matrix H based on n real user directions and the m virtual user directions, where $$H = \begin{pmatrix} Hr \\ V \end{pmatrix},$$

and Hr is a spatial channel matrix, with an order of m×k, used to represent the n real user directions, and form the target beam based on the matrix H, so that the null of the target beam is aligned with the m virtual user directions. In this way, almost no impact is exerted on a traffic requirement while generation of an active echo is reduced.

In some feasible embodiments, a special example of the obtained vectors v0, v1, v2, . . . , and v(m−1) is an orthogonal basis vector in the matrix G. In this case, it is assumed that the matrix Hr with an order of n×k is an original spatial channel matrix, where n is a positive integer less than k. That is, n dimensions in k dimensions are used to serve the traffic requirement, and m dimensions may be selected from the remaining (k−n) dimensions as the virtual user directions. It may be learned that al is less than or equal to k−n. For example, k is equal to 64, and n is equal to 40. In other words, 40 dimensions are used to serve the traffic requirement, and m (m≤24) dimensions may be selected from the remaining 24 dimensions as the virtual user directions.

With reference to the first aspect, and the first implementation, the second implementation, the third implementation, and the fourth implementation of the first aspect, in a fifth implementation of the first aspect of the embodiments of this application, the network device determines a target frequency band based on the traffic requirement, where the target frequency band is one of a plurality of frequency bands obtained by dividing a full frequency band based on a preset frequency band division manner; and the network device obtains a scattering parameter matrix that is of the passive echoes in the antenna system and that is formed at the target frequency band, to adapt to a frequency response characteristic, namely, a characteristic indicating that the scattering parameter matrix of the passive echoes varies with a frequency, of the passive echoes.

According to a second aspect of the embodiments of this application, a network device is provided, and includes an antenna system and a processor. The antenna system may be configured to send and receive a signal. The processor may be configured to: obtain a scattering parameter matrix of passive echoes in the antenna system, where the antenna system includes k antennas, and k is a positive integer; determine m virtual user directions based on the scattering parameter matrix of the passive echoes, where the m virtual user directions are m directions in which total signal strength of the passive echoes is highest, and m is a positive integer; and form a target beam based on n real user directions and the m virtual user directions, where a null of the target beam is aligned with the m virtual user directions, n is a positive integer, and n+m≤k. In this way, generation of an active echo is reduced, and therefore no circulator is needed in the antenna system in the network device, to reduce a volume of the antenna system, so that the antenna system can be further integrated.

With reference to the second aspect, in a first implementation of the second aspect of the embodiments of this application, the scattering parameter matrix of the passive echoes may be represented as a matrix G with an order of k×k, a value in an $i^{th}$ row and a $j^{th}$ column in the matrix G is g(i, j), and g(i, j) is equal to a signal strength ratio between a passive echo received by an antenna in an $i^{th}$ column from an antenna in the $j^{th}$ column and a signal transmitted by the antenna in the $i^{th}$ column. In this case, signal strength, in each direction, of a passive echo received by each antenna is obtained.

Specifically, signal strength of the passive echo received by the antenna is denoted as $l_{i,j}$, and $l_{i,j}$ is equal to signal strength of a passive echo that is generated by a signal sent by a $j^{th}$ antenna and that is received by an $i^{th}$ antenna.

It is assumed that k is a quantity of antennas in the network device, and a matrix L, with an order of k×k, of signal strength of passive echoes received by all the antennas is as follows:

$$L = \begin{pmatrix} l_{0,0} & l_{0,1} & \cdots & l_{0,k} \\ l_{1,0} & l_{1,1} & & l_{1,k} \\ \cdots & & \cdots & \cdots \\ l_{k,0} & l_{0,0} & \cdots & l_{k,k} \end{pmatrix}$$

After the matrix L of the signal strength of the passive echoes is determined, the scattering parameter matrix of the passive echoes may be calculated based on the matrix L. Specifically, the scattering parameter matrix of the passive echoes is the matrix G, the value in the $i^{th}$ row and the $j^{th}$ column in G is g(i, j), and g(i, j) is equal to a ratio of strength $L_{i,j}$ of the passive echo received by the antenna in the $i^{th}$ column from the antenna in the $j^{th}$ column to signal strength $s_i$ of the signal transmitted by the antenna in the $i^{th}$ column, in other words, $$g(i, j) = l_{i,j}/s_i$$

Finally, the matrix G is obtained as follows:

$$G = \begin{pmatrix} g(0,0) & g(0,1) & \cdots & g(0,k-1) \\ g(1,0) & g(1,1) & & g(1,k-1) \\ \cdots & & & \cdots \\ g(k-1,0) & g(k-1,1) & \cdots & g(k-1,k-1) \end{pmatrix}$$

In some feasible embodiments, the obtained value g(i, j) may alternatively be represented by using a complex number, in other words, $$g(i,j) = A_{i,j} * e^{i\phi_{i,j}}$$

Herein, in $A_{i,j} * e^{i\phi_{i,j}}$, $A_{i,j}$ is an amplitude, and $\phi_{i,j}$ is a phase.

With reference to the first implementation of the second aspect, in a second implementation of the second aspect of the embodiments of this application, the processor is specifically configured to perform dimension reduction processing on the matrix G by using a preset algorithm, to obtain a matrix V with an order of m×k. Row vectors in the matrix V are respectively v0, v1, . . . , and v(m−1), and are used to respectively represent the m virtual user directions. In this case, expressions of the m virtual user directions are obtained.

In this embodiment of this application, the matrix G is the scattering parameter matrix of all the antennas in the antenna system, and represents the signal strength of the passive echoes received by all the antennas, and the m virtual user directions are the m directions in which the total signal strength of the passive echoes is highest. Therefore, if the remaining (k−m) directions are ignored, any row Gr in the matrix G may be approximately obtained by performing linear combination on v0, v1, . . . , and v(m−1):

$$Gr \approx q0 \times v0 + q1 \times v1 + q2 \times v2 + \ldots + q(m-1) \times v(m-1)$$

Herein, all of q0, q1, . . . and q(m−1) are constants.

With reference to the second implementation of the second aspect, in a third implementation of the second aspect of the embodiments of this application, the processor is further configured to: perform singular value decomposition on the matrix G, to obtain $U*S*V^H$, and use first m row vectors in $V^H$ as the matrix V, where U is a unitary matrix with an order of m×m, S is a positive semidefinite diagonal matrix with an order of m×k, and $V^H$ is a unitary matrix with an order of k×k. Any one of the obtained vectors v0, v1, . . . , and v(m−1) is a vector representing a spatial direction, and has both a length and a direction. The direction of the vector is used to represent the virtual user direction, and the length of the vector is used to represent the signal strength of the passive echo.

Singular value decomposition is mainly applied to principal component analysis (PCA) in statistics. As a data analysis method, principal component analysis is used to find out a "pattern" implied in a large amount of data. Principal component analysis may be used in pattern recognition, data compression, and the like, to map a dataset into low-dimensional space. Eigenvalues in the dataset are arranged based on importance. A dimension reduction process is a process of discarding an unimportant eigenvector, and space that includes the remaining eigenvectors is space obtained after dimension reduction.

With reference to the second implementation and the third implementation of the second aspect, in a fourth implementation of the second aspect of the embodiments of this application, the processor is further configured to: determine a target spatial channel matrix H based on the n real user directions and the m virtual user directions, where $$H = \begin{pmatrix} Hr \\ V \end{pmatrix},$$

and Hr is a spatial channel matrix, with an order of m×k, used to represent the n real user directions; and form the target beam based on the matrix H, so that the null of the target beam is aligned with the m virtual user directions. In this way, almost no impact is exerted on a traffic requirement while generation of an active echo is reduced.

In some feasible embodiments, a special example of the obtained vectors v0, v1, v2, . . . , and v(m−1) is an orthogonal basis vector in the matrix G. In this case, it is assumed that the matrix Hr with an order of n×k is an original spatial channel matrix, where n is a positive integer less than k. That is, n dimensions in k dimensions are used to serve the traffic requirement, and m dimensions may be selected from the remaining (k−n) dimensions as the virtual user directions. It may be learned that m is less than or equal to (k−n). For example, k is equal to 64, and n is equal to 40. In other words, 40 dimensions are used to serve the traffic requirement, and m(m≤24) dimensions may be selected from the remaining 24 dimensions as the virtual user directions.

With reference to the second aspect, and the first implementation, the second implementation, the third implementation, and the fourth implementation of the second aspect, in a fifth implementation of the second aspect of the embodiments of this application, the processor is further configured to: determine a target frequency band based on the traffic requirement, where the target frequency band is one of a plurality of frequency bands obtained by dividing a full frequency band based on a preset frequency band division manner; and obtain a scattering parameter matrix that is of the passive echoes in the antenna system and that is formed at the target frequency band, to adapt to a frequency response characteristic, namely, a characteristic indicating that the scattering parameter matrix of the passive echoes varies with a frequency, of the passive echoes.

According to a third aspect of the embodiments of this application, a network device is provided, and includes an antenna system and a processor. The antenna system is configured to send and receive a signal. The processor is configured to: obtain a scattering parameter matrix of passive echoes in the antenna system, where the antenna system includes k antennas, and k is a positive integer; determine m virtual user directions based on the scattering parameter matrix of the passive echoes, where the m virtual user directions are in directions in which total signal strength of the passive echoes is highest, and m is a positive integer; and form a target beam based on n real user directions and the m virtual user directions, where a null of the target beam is aligned with the m virtual user directions, n is a positive integer, and n+m≤k. In this way, generation of an active echo is reduced, and therefore no circulator is needed in the antenna system in the network device, to reduce a volume of the antenna system, so that the antenna system can be further integrated.

In some feasible embodiments, the antenna system includes an antenna, a filter, a first coupler, a second coupler, a power amplifier PA, a coupler switch, and a radio transceiver apparatus. The first coupler and the second coupler are sequentially disposed side by side in front of the PA in a transmission direction of the antenna. The first coupler communicates with the PA, the second coupler communicates with the first coupler, and the coupler switch communicates with the radio transceiver apparatus. When the antenna sends a forward signal, the coupler switch is turned to the first coupler, so that a forward signal output by the PA is received by the radio transceiver apparatus. There is insufficient isolation of the switch, and therefore a pure passive echo cannot be obtained through coupling. Therefore, in some feasible embodiments, a time interval for sending two forward signals may be increased, so that sending of the forward signal and receiving of the passive echo can be completely staggered in time, to obtain a pure passive echo. The passive echoes are then aligned with the forward signals, and then the scattering parameter matrix G of the echoes is solved based on a least squares group in frequency domain groups.

According to a third aspect, an embodiment of this application provides a computer-readable storage medium that includes instructions. When the instructions are run on a computer, the computer is enabled to perform the method according to the foregoing aspects.

In the embodiments of this application, the network device obtains the scattering parameter matrix of the passive echoes in the antenna system; determines the virtual user directions based on the scattering parameter matrix of the passive echoes; and when the target beam is formed based on a real user location, enables the null of the target beam to be aligned with the virtual user directions. In this way, generation of an active echo is reduced, and therefore no circulator is needed in the antenna system in the network device, so that the antenna system can be further integrated, to reduce a volume of the antenna system.

BRIEF DESCRIPTION OF DRAWINGS

FIG. 1-2 is a schematic diagram of an embodiment of a formed traffic beam;

FIG. 1-3 is a schematic diagram of an embodiment of a plurality of formed narrow beams;

FIG. 1-4 is a schematic diagram of an embodiment of an antenna system in which a circulator is disposed;

FIG. 1-5 is a schematic diagram of an embodiment of a PA in a doherty architecture;

FIG. 1-6 is a schematic diagram of another embodiment of a PA in a doherty architecture;

FIG. 2 is a schematic diagram of an embodiment of a signal processing method according to an embodiment of this application;

FIG. 3-1 is a schematic diagram of another embodiment of a signal processing method according to an embodiment of this application;

FIG. 3-2 is a schematic diagram of an embodiment of a null according to an embodiment of this application;

FIG. 3-3 shows a horizontal pattern and a vertical pattern of a traffic beam according to an embodiment of this application;

FIG. 3-4 shows a horizontal pattern and a vertical pattern of a target beam according to an embodiment of this application;

FIG. 3-5 is a schematic diagram of an embodiment in which a plurality of antennas are integrated according to an embodiment of this application;

FIG. 4 is a schematic diagram of an embodiment of a network device according to an embodiment of this application;

FIG. 5-1 is a schematic diagram of an embodiment of a network device according to an embodiment of this application;

FIG. 5-2 is a schematic diagram of an embodiment of an antenna system; and

FIG. 5-3 is a schematic diagram of an embodiment in which a plurality of antennas in a network device are integrated.

DESCRIPTION OF EMBODIMENTS

Embodiments of this application provide a signal processing method and a network device, to reduce generation of an active echo.

It should be understood that the terms "include", "contain" and any variant thereof mean to cover non-exclusive inclusion, for example, a process, method, system, product, or device that includes a list of steps or units is not necessarily limited to those steps or units that are expressly listed, but may include other steps or units not expressly listed or inherent to such a process, method, product, or device.

Figure 1:
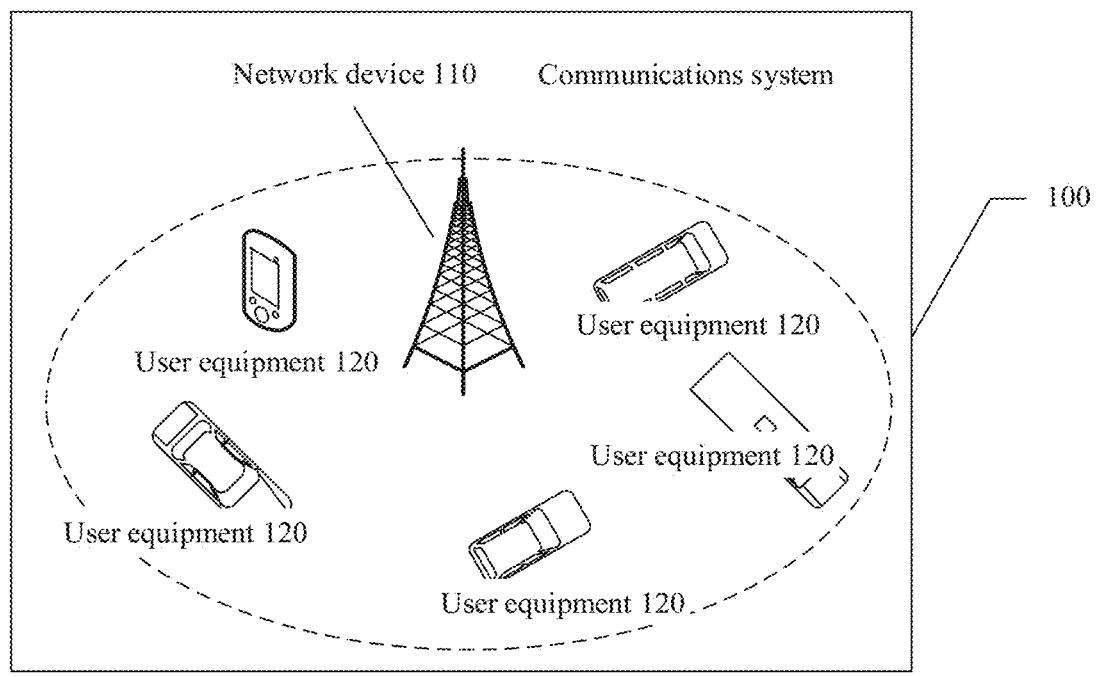
FIG. 1-1 is a schematic diagram of an embodiment of a communications system according to an embodiment of this application.

This application may be applied to a communications system 100 shown in FIG. 1-1. The communications system 100 includes a network device 110 and a plurality of user equipments (UE) 120.

The network device 110 may be an evolved NodeB (e-nodeB), a macro base station, a micro base station (or referred to as a "small cell"), a pico base station, an access point (AP), a transmission point (TP), a new generation NodeB (gNodeB), or the like in an LTE system, an NR system, or a license-assisted access long term evolution (LAA-LTE) system.

The UE 120 may be a mobile station (MS), a mobile terminal (mobile terminal), an intelligent terminal, or the like, The UE 120 may communicate with one or more core networks by using the network device 110. For example, the UE 120 may be a mobile phone (or referred to as a "cellular" phone) or a computer that includes a mobile terminal. The UE 120 may alternatively be a portable, pocket-sized, handheld, computer built-in, or in-vehicle mobile apparatus, and UE 120 in a future NR network. The UE 120 exchanges voice or data with the network device 110. In this application, the UE 120 may further include a relay device, and any device that can perform data communication with a base station may be considered as the UE 120. In this application, description is provided by using LIE in a general sense. In some feasible implementations, the UE 120 may alternatively be a vehicle in a vehicle-to-infrastructure/vehicle/pedestrian (V2X) system.

In this embodiment of this application, an MM technology may be applied to the network device 110. It should be noted that multiple input multiple output (MIMO) means that a plurality of antennas (for example, 2/4/8 antennas) are used at both a transmit end a receive end, to form a plurality of channels between the transmit end and the receive end. On the basis of MIMO, in the MM technology, a large quantity of antennas (for example, 64/128/256 antennas) are used to serve a relatively small quantity of users, to greatly improve spectral efficiency.

Figures 1, 2:
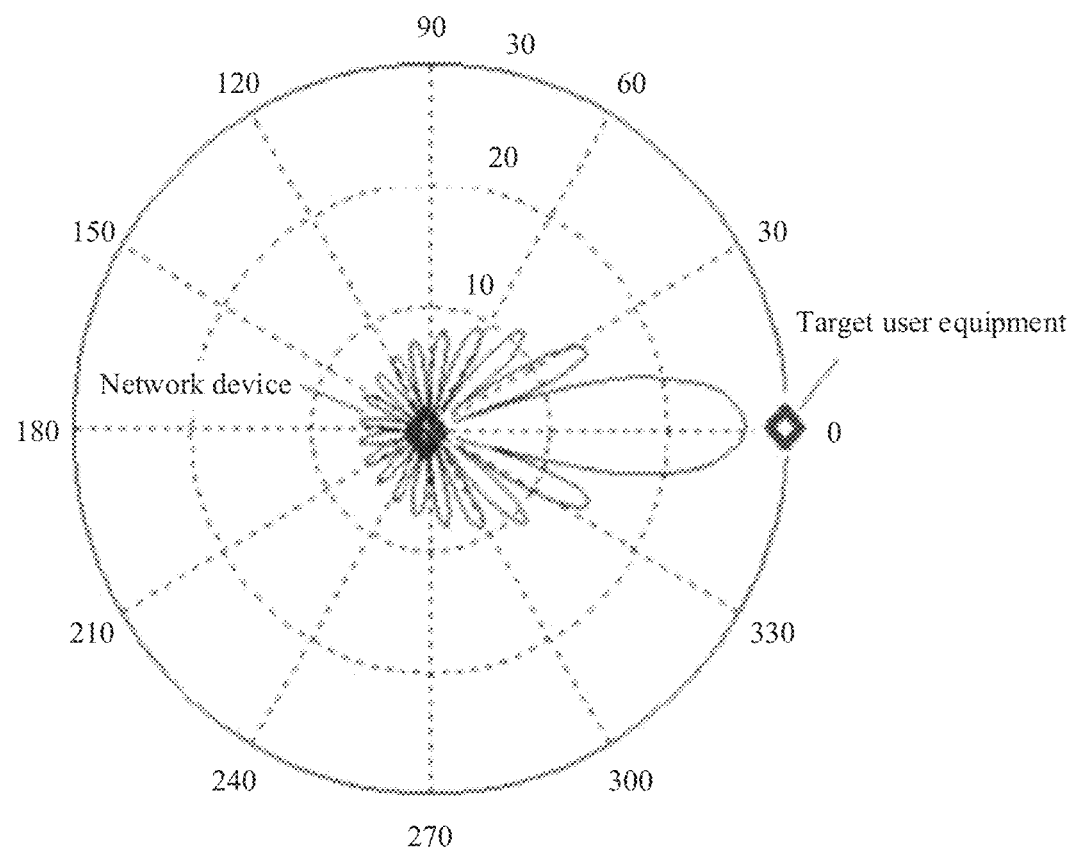

Specifically, the network device may perform beamforming based on a traffic requirement, to form a traffic beam, for example, a traffic beam shown in FIG. 1-2. A main lobe of the traffic beam is aligned with target user equipment, so that the target user equipment can use a wireless network service provided by the network device. By using the MIMO technology or the MM technology, the network device may form a plurality of narrow beams shown in FIG. 1-3, to simultaneously serve a plurality of user equipments.

It should be noted that in the MIMO technology, a space resource can be fully utilized, an adaptive array antenna is used, a plurality of antennas are used to implement multiple input multiple output, and different beams are formed in different user directions, to exponentially increase a system channel capacity without increasing spectrum resources and timeslot resources. For example, eight antennas are used in a MIMO technology used in a 4th generation mobile communications technology (4G) network. On the basis of the MIMO technology, in the MM technology, massive antennas, for example, 64/128/256 antennas, are deployed in the network device. A quantity of antenna channels is significantly increased, and there is a multi-antenna form of a larger-scale antenna array.

By using the MM technology, the network device forms a plurality of narrow beams, and concentrates radiation in a smaller space area, so that there is higher energy efficiency on a radio frequency transmission link between a base station and the user equipment, to reduce a loss of transmit power of the base station. In addition, a quantity of simultaneously served user equipments is usually far less than a quantity of antennas in the base station, and therefore a capability of simultaneously receiving and sending a plurality of different signals by the network device is improved, thereby greatly improving frequency utilization.

After the network device 110 that uses the MIMO technology or the MM technology transmits a signal, an active echo is generated, resulting in a loss of efficiency of a PA. To cancel the active echo, a circulator (shown in FIG. 1-4) is disposed in an antenna system of the network device 110. Usually, the antenna system further includes an antenna, a band-pass filter (BPF), the PA, a low noise amplifier (LNA), an uplink path, pre-distortion (PD) feedback, an analog to digital converter (ADC), and a digital to analog converter (DAC), which are all common components in an antenna system. Details are not described herein. However, for an antenna system that includes a large quantity of antennas and that uses the MM technology, the circulator occupies a relatively large circuit board area and volume, and consequently the antenna system cannot be further integrated.

Currently, the active echo may be canceled by transforming a circuit of the PA into a balanced circuit. For example, two PAs (shown in FIG. 1-5) in only one doherty architecture (DHT 1) are transformed into four PAs (shown in FIG. 1-6) in two doherty architectures (DHT 1 and DHT 2). Two PAs in a single DHT architecture are combined by using a combiner (combiner). However, after the balanced circuit is obtained through transformation, an area and a volume of the antenna system are doubled as a quantity of PAs is doubled, which also hinders further integration of the antenna.

Currently, linearity may be improved by improving a digital pre-distortion (DPD) algorithm, to cancel the active echo. Specifically, a distortion model of the PA may be written as follows:

$$y=f(x, z)$$

Herein, x is a forward signal, and z represents active echoes received by all antennas. In this case, modeling may be performed for the PA impacted by a standing wave, to obtain the following model:

$$y=F(x0, x1, \ldots, x(k-1))$$

Herein, k is a quantity of antennas. In this case, the DPD algorithm may be modeled as an inverse model of the foregoing model:

$$y=\text{inv}F(x0, x1, \ldots, x(k-1))$$

Herein, y is a feedback signal of the DPD algorithm, invF( ) is an inverse function of F( ), and x0, x1, . . . , and x(k−1) are forward signals sent by all the antennas. However, this exponentially increases complexity, and it needs to be ensured that processes of the DPD algorithm for all the antennas are processed on a single chip, which is not practical in engineering. In addition, the DPD algorithm theoretically can resolve only a nonlinear problem of power of all the antennas, and cannot resolve other problems such as a reduction in the efficiency of the PA and a reduction in saturation power.

Therefore, this application provides a signal processing method. Referring to FIG. 2, the method includes the following steps:

201. A network device obtains a scattering parameter matrix of passive echoes in an antenna system, where the antenna system includes k antennas, and k is a positive integer.

202. The network device determines m virtual user directions based on the scattering parameter matrix of the passive echoes, where the m virtual user directions are m directions in which total signal strength of the passive echoes is highest, and m is a positive integer.

203. The network device forms a target beam based on n real user directions and the m virtual user directions, where a null of the target beam is aligned with the m virtual user directions, n is a positive integer, and n+m≤k.

In this embodiment of this application, the network device obtains the scattering parameter matrix of the passive echoes in the antenna system; determines the m virtual user directions based on the scattering parameter matrix of the passive echoes; and finally forms, based on then real user directions and the m virtual user directions, the target beam whose null is aligned with the virtual user directions. In this way, generation of an active echo is reduced, and therefore no circulator is needed in the antenna system in the network device, to reduce a volume of the antenna system, so that the antenna system can be further integrated.

Figures 1, 2, 3:
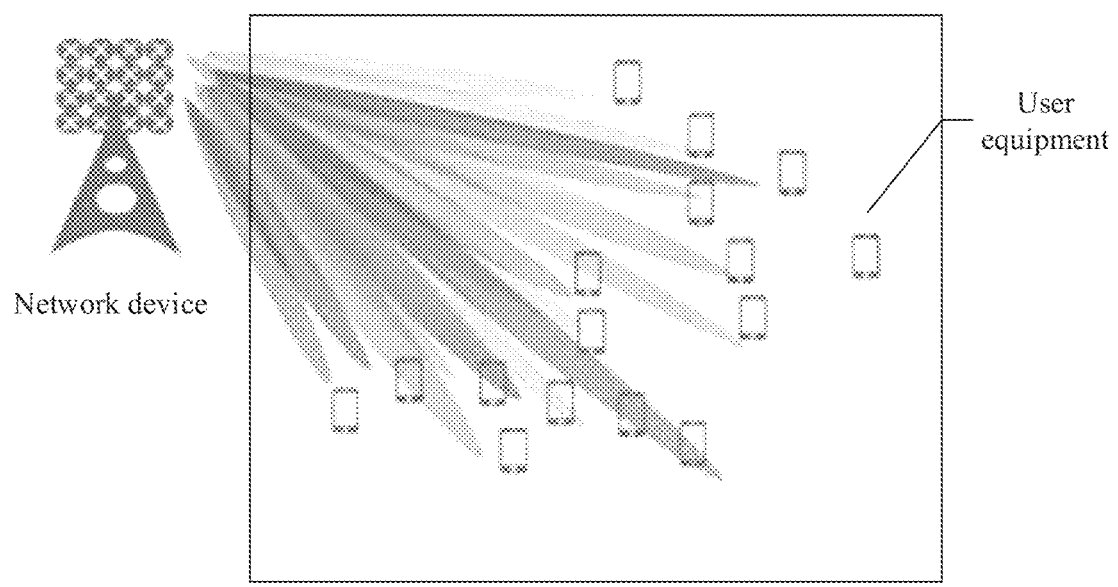

Specifically, this application provides a signal processing method. Referring to FIG. 3-1, the method includes the following steps.

301. A network device determines a target frequency band based on a traffic requirement, where the target frequency band is one of a plurality of frequency bands obtained by dividing a full frequency band based on a preset frequency band division manner.

Because of a frequency response characteristic of passive echoes, a scattering parameter matrix of the passive echoes varies with a frequency. Therefore, in some possible implementations, the full frequency band may be divided based on the preset frequency band division manner, to obtain a plurality of frequency bands, and then a passive echo at each frequency band is measured, to obtain different scattering parameter matrices. For example, if a frequency band supported by an antenna ranges from 824 to 896 (unit: megahertz), in other words, a width of the full frequency band is 896−824=72 megahertz, the preset frequency band division manner may be: using every 8 megahertz as a frequency band, and dividing the full frequency band into 72/8=9 frequency bands. In this embodiment of this application, the network device first determines the target frequency band based on user equipment. The target frequency band is one of a plurality of frequency bands obtained by dividing the full frequency band based on the preset frequency band division manner. For example, a frequency band used by the user equipment is 825 megahertz. In this case, the selected target frequency band ranges from 824 megahertz to 832 megahertz, then a scattering parameter matrix that is of the passive echoes and that is formed at the target frequency band is obtained, and then the passive echoes at the target frequency band are measured.

302. The network device obtains a scattering parameter matrix that is of passive echoes in an antenna system and that is formed at the target frequency band.

It should be noted that an echo (including an active echo and the passive echo) refers to a signal that is reversely fed into a PA on a channel when adjacent antennas are mutually coupled due to insufficient isolation between the antennas that exists when the network device transmits a signal. A difference is as follows: The passive echo refers to a signal that is reversely fed when antennas in the network device send signals with a same amplitude and a same phase. The scattering parameter matrix of the passive echoes is a property of each antenna system in the network device, exists when the network device is in an idle state, and does not change with served user equipment or a signal environment. The active echo refers to a signal that is reversely fed when the network device sends a signal whose amplitude and phase are determined based on a location and a requirement of the served user equipment, and changes with the location and the requirement of the user equipment.

It should be noted that a passive echo received by the antenna includes a signal generated by a signal transmitted by the antenna, and also includes a signal generated after signals transmitted by other antennas are coupled. In this embodiment of this application, signal strength of the passive echo received by the antenna is denoted as $l_{i,j}$, and $l_{i,j}$ is equal to signal strength of a passive echo that is generated by a signal sent by a $j^{th}$ antenna and that is received by an $i^{th}$ antenna. In this case, a matrix L of signal strength of passive echoes received by all antennas may be obtained as follows:

$$L = \begin{pmatrix} l_{0,0} & l_{0,1} & \cdots & l_{0,k} \\ l_{1,0} & l_{1,1} & & l_{1,k} \\ \cdots & & \cdots & \cdots \\ l_{k,0} & l_{0,0} & \cdots & l_{k,k} \end{pmatrix}$$

The matrix L is a matrix with an order of k×k, and k is a quantity of antennas in the network device.

After the matrix L of the signal strength of the passive echoes is determined, the scattering parameter matrix of the passive echoes may be calculated based on the matrix L. Specifically, the scattering parameter matrix of the passive echoes is a matrix G with an order of k×k, a value in an $i^{th}$ row and a $j^{th}$ column in G is g(i, j), and g(i, j) is equal to a ratio of signal strength $L_{i,j}$ of a passive echo received by an antenna in an $i^{th}$ column from an antenna in the $j^{th}$ column to signal strength $s_i$ of a signal transmitted by the antenna in the $i^{th}$ column, in other words, $$g(i, j) = l_{i,j}/s_i$$

Finally, the matrix G is obtained as follows:

$$G = \begin{pmatrix} g(0,0) & g(0,1) & \cdots & g(0,k-1) \\ g(1,0) & g(1,1) & & g(0,k-1) \\ \cdots & & & \cdots \\ g(k-1,0) & g(k-1,1) & \cdots & g(0,k-1) \end{pmatrix}$$

For example, if the network device includes 64 antennas, in other words, k=64, the obtained passive echo parameter is a matrix G with an order of 64×64:

$$G = \begin{pmatrix} g(0,0) & g(0,1) & \cdots & g(0,63) \\ g(1,0) & g(1,1) & & g(0,63) \\ \cdots & & & \cdots \\ g(63,0) & g(63,1) & \cdots & g(63,63) \end{pmatrix}$$

In this case, signal strength of a passive echo that is generated by a signal transmitted by a $0^{th}$ antenna and that is received by the $0^{th}$ antenna is $l_{0,0}$, strength of the signal transmitted by the $0^{th}$ antenna is $s_0$, and $$g(0,0) = l_{0,0}/s_0$$

Signal strength of a passive echo that is generated by a signal transmitted by a $(k-1)^{th}$ antenna and that is received by the $0^{th}$ antenna is $l_{0,k-1}$, the strength of the signal transmitted by the $0^{th}$ antenna is $S_0$, and $$g(0,k-1) = l_{0,k-1}/s_0$$

In some feasible embodiments, the obtained value g(i, j) may alternatively be represented by using a complex number, in other words, $$g(i,j) = A_{i,j}*e^{i\phi_{i,j}}$$

Herein, in $A_{i,j}*e^{i\phi_{i,j}}$, $A_{i,j}$ is an amplitude, and $\phi_{i,j}$ is a phase.

It should be noted that the network device may specifically send a signal for testing the passive echo, to obtain a scattered signal of the passive echo, or may perform a test on a traffic beam sent based on a real traffic requirement. This is not limited herein.

303. The network device determines in virtual user directions based on the scattering parameter matrix of the passive echoes, where the m virtual user directions are m directions in which total signal strength of the passive echoes is highest, and in is a positive integer.

In this embodiment of this application, the in virtual user directions are the m directions in which the total signal strength of the passive echoes is highest. Specifically, it is assumed that there is user equipment in one of the m virtual user directions. In this case, when the network device transmits a signal in the virtual user direction, the network device receives a signal whose strength is equal to signal strength of the passive echo.

Specifically, after obtaining the scattering parameter matrix (matrix G) of the passive echoes, the network device may perform dimension reduction on the matrix G by using a preset algorithm, to obtain a matrix V with an order of m×k, where in is a quantity of virtual user directions, and in is less than k. Row vectors in the matrix V are respectively v0, v1, ..., and v(m−1), and are used to represent the m virtual user directions. In this case, the matrix V may be represented as follows:

$$V = \begin{pmatrix} v0 \\ v1 \\ \dots \\ v(m-1) \end{pmatrix}$$

For example, the preset algorithm may be singular value decomposition (SVD). Specifically, SVD is performed on the matrix G, to obtain a matrix G that is equal to $U*S*R^H$. The matrix U is a unitary matrix with an order of m×m, the matrix $R^H$ is a unitary matrix with an order of k×k, and the matrix S is a positive semidefinite diagonal matrix with an order of m×k. The matrix S is a singular value of the matrix G:

$$S = \begin{pmatrix} s0 & & & & & \\ & s1 & & & 0 & \\ & & \dots & & & \\ & & & \dots & & \\ & & & & \dots & \\ & & & & & s(k-1) \\ & 0 & & & & \end{pmatrix}$$

Herein, s0, s1, ..., and s(k−1) are arranged in descending order.

Therefore. $R^H$ is obtained as follows:

$$R^H = \begin{pmatrix} r_{00} & r_{01} & \dots & r_{0(k-1)} \\ r_{10} & r_{11} & \dots & r_{1(k-1)} \\ \dots & \dots & \dots & \dots \\ r_{(k-1)0} & r_{(k-1)1} & \dots & r_{(k-1)(k-1)} \end{pmatrix}$$

It should be noted that in the obtained matrix $R^H$, a $0^{th}$ row vector to a $(k-1)^{th}$ row vector are sequentially directions in which the total signal strength is sorted in descending order. In this case, first m row vectors in the $R^H$ are selected to form a new matrix V, to obtain the m directions in which the total signal strength is highest:

$$V = \begin{pmatrix} r_{00} & r_{01} & \dots & r_{0(k-1)} \\ r_{10} & r_{11} & \dots & r_{1(k-1)} \\ \dots & \dots & \dots & \dots \\ r_{(m-1)0} & r_{(m-1)1} & \dots & r_{(m-1)(k-1)} \end{pmatrix}$$

In other words, Vi=$(r_{i0}, r_{i1}, \dots, r_{i(k-1)})$, where i is equal to 0, 1, 2, ..., and m−1. Row vectors in the matrix V are respectively v0, v1, ..., and v(m−1), and are used to represent the m virtual user directions, in other words, $$V = \begin{pmatrix} v0 \\ v1 \\ \dots \\ v(m-1) \end{pmatrix}$$

It should be noted that any one of v0, v1, ..., and v(m−1) is a vector representing a spatial direction, and has both a length and a direction. The direction of the vector is used to represent the virtual user direction, and the length of the vector is used to represent the signal strength of the passive echo.

It should he noted that singular value decomposition is mainly applied to principal component analysis (PCA) in statistics. As a data analysis method, principal component analysis is used to find out a "pattern" implied in a large amount of data. Principal component analysis may be used in pattern recognition, data compression, and the like, to map a dataset into low-dimensional space. Eigenvalues in the dataset are arranged based on importance. A dimension reduction process is a process of discarding an unimportant eigenvector, and space that includes the remaining eigenvectors is space obtained after dimension reduction.

In this embodiment of this application, the matrix G is the scattering parameter matrix of all the antennas in the antenna system, and represents the signal strength of the passive echoes received by all the antennas, and the m virtual user directions are the m directions in which the total signal strength of the passive echoes is highest. Therefore, if the remaining (k−m) directions are ignored, any row Gr in the matrix G may be approximately obtained by performing linear combination on the m virtual user directions v0, v1, ..., and v(m−1):

$$Gr \approx q0 \times v0 + q1 \times v1 + q2 \times v2 + \dots + q(m-1) \times v(m-1)$$

Herein, all of q0, q1, ..., and q(m−1) are constants.

It should be noted that the quantity of virtual user directions may be determined by a staff member, or may be determined by using a program. For example, a network device that includes 64 antennas may form a maximum of 64 dimensions, in other words, transmit signals in 64 different directions by using a same time-frequency resource. However, there are usually no so many user equipments in a cell. If only 40 dimensions are required at a moment to meet a user requirement, the staff member may use the remaining 24 dimensions as virtual user directions. In other words, 40 dimensions are used to serve the traffic requirement, and m (m≤24) dimensions may be selected from the remaining 24 dimensions as the virtual user directions. If a program is used, a preset value may be first determined, and the value is signal strength of an active echo that needs to be cancelled, for example, 6 dB. In this case, in the program, first several directions may be first used as the virtual user directions, and simulation is performed, to determine signal strength that can be canceled in comparison with a case in which no virtual user direction is used. If a value of signal strength that is canceled is less than 6 dB, the quantity of virtual user directions is increased. If a value of signal strength that is canceled exceeds 6 dB, the quantity of virtual user directions is decreased until a proper quantity is determined.

For example, if the quantity of antennas in the network device is 64, in other words, k=64, the obtained scattering parameter matrix of the passive echoes is as follows:

$$G = \begin{pmatrix} g(0,0) & g(0,1) & \ldots & g(0,63) \\ g(1,0) & g(1,1) & & g(0,63) \\ \ldots & & & \ldots \\ g(63,0) & g(63,1) & \ldots & g(63,63) \end{pmatrix}$$

It is assumed that there are eight virtual user directions, in other words, m=8. In this case, dimension reduction may be performed on the matrix G, to obtain a matrix V with an order of 8×64:

$$V = \begin{pmatrix} v0 \\ v1 \\ v2 \\ v3 \\ v4 \\ v5 \\ v6 \\ v7 \end{pmatrix}$$

Herein, each of v0, v1, v2, v3, v4, v5, v6, and v7 is a matrix with an order of 1×64.

It should be noted that v0, v1, v2, . . . , and v(m−1) are m dimensions in dimensions that are formed by the network device by using the k antennas and that may be a maximum of k dimensions, and the remaining dimensions are used to serve a real traffic requirement. It should be noted that the obtained vectors v0, v1, . . . , and v(m−1) are not a unique solution of virtual user directions, and different matrices V may be obtained based on different algorithms for performing dimension reduction on the matrix G, in other words, different virtual user directions may be obtained. It should be noted that a value of m may be manually set, or may be determined by using the matrix G. This is not limited herein.

It should be noted that a special example of the obtained vectors v0, v1, . . . , and v(m−1) is an orthogonal basis vector in the matrix G. In this case, it is assumed that a matrix Hr with an order of n×k is an original spatial channel matrix, where n is a positive integer less than k. That is, n dimensions in k dimensions are used to serve the traffic requirement, and m dimensions may be selected from the remaining (k−n) dimensions as the virtual user directions. It may be learned that m is less than or equal to k−n. For example, k is equal to 64, and n is equal to 40. In other words, 40 dimensions are used to serve the traffic requirement, and eight dimensions are selected from the remaining 24 dimensions as the virtual user directions.

304. The network device forms a target beam based on n real user directions and the m virtual user directions, where a null of the target beam is aligned with the m virtual user directions, n is a positive integer, and n+m≤k.

In this embodiment of this application, the null refers to an intersection point of two adjacent lobes in a beam. For example, a null shown in FIG. 3-2 is an intersection point of a main lobe and a side lobe of the target beam, and a radiation signal formed by the antenna system at the intersection point is relatively weak.

In this embodiment of this application, after the matrix V representing the m virtual user directions is determined, a new spatial channel matrix H with an order of (m+n)×k may be obtained:

$$H = \begin{pmatrix} Hr \\ V \end{pmatrix}$$

The matrix Hr represents directions of n user equipments served by the network device. When these user equipments move, the matrix Hr is updated, and the matrix H is also updated. In addition, in a moving process of the user equipment, if there is a very high correlation between a direction in the matrix Hr and a direction in the matrix V, another user equipment may be used as a new direction to replace the old direction, in other words, the matrix Hr may be updated. In this case, the network device may perform beamforming based on both the real user direction and the virtual user direction, that is, perform beamforming on the served user equipment based on the matrix H, to obtain the target beam.

It should be noted that if the beam whose null is aligned with the virtual user directions is formed, in other words, energy of a transmitted signal in the directions v0, v1, v2, . . . , and v(m−1) is decreased, even if the network device sends forward signals with different amplitudes and different phases, energy of an active echo that is reversely fed is also decreased.

In comparison with a beam that is formed by using no virtual user direction, beamforming weight of the target beam is equivalent to adjusting a phase and/or an amplitude of the beam, so that the null of the target beam is aligned with the virtual user directions. For example, a horizontal pattern (horizontal pattern) and a vertical pattern (vertical pattern) shown in FIG. 3-3 represent a traffic beam formed by the network device only based on the real user direction and not based on the virtual user direction. If the virtual user directions are a horizontal angle of 30° and a vertical angle of 82°, the network device may form a target beam shown in FIG. 3-4. In comparison with the case in FIG. 3-3, a phase and/or an amplitude of the target beam are/is adjusted. Specifically, a horizontal beam direction of the traffic beam is shifted by 2°, and energy of a main lobe is decreased by 0.5 dB. In this way, when impact on the traffic requirement can be ignored, a null of the target beam is aligned with the m virtual user directions, to effectively reduce active echoes, so as to achieve an effect shown in FIG. 3-5. Eventually, no circulator is needed in the antenna system, to reduce a volume of the antenna system, so that the antenna system can be further integrated.

The method embodiments provided in this application are described above, and a specific apparatus provided in this application is described below.

Figures 1, 2, 3, 4:
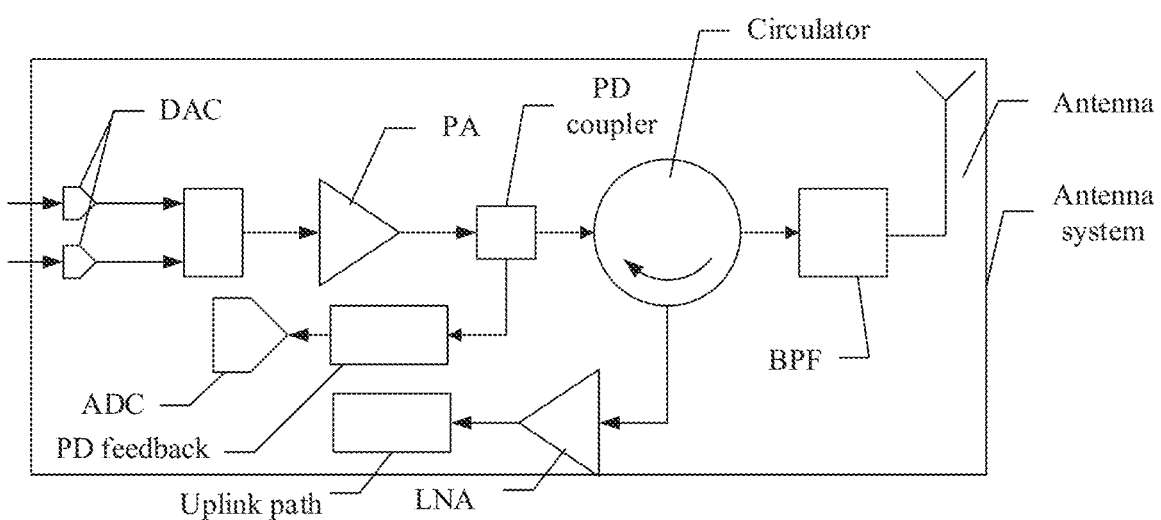

Referring to FIG. 4, an embodiment of this application further provides a network device 400, including an antenna system 410 and a processor 420. The antenna system 410 includes k antennas, where k is a positive integer, and is configured to send and receive a signal. The processor 420 is configured to: obtain a scattering parameter matrix of passive echoes in the antenna system 410; determine m virtual user directions based on the scattering parameter matrix of the passive echoes, where the m virtual user directions are m directions in which total signal strength of the passive echoes is highest, and m is a positive integer; and finally form, based on n real user directions and the m virtual user directions, a target beam whose null is aligned with the m virtual user directions, where n is a positive integer, and n+m≤k. In this way, generation of an active echo is reduced, and therefore no circulator is needed in the antenna system in the network device, to reduce a volume of the antenna system, so that the antenna system can be further integrated.

The scattering parameter matrix of the passive echoes is a matrix G with an order of k×k, a value in an $i^{th}$ row and a $j^{th}$ column in the matrix G is g(i, j), and g(i, j) is equal to a signal strength ratio between a passive echo received by an antenna in an i<sup>th</sup> column from an antenna in the j<sup>th</sup> column and a signal transmitted by the antenna in the i<sup>th</sup> column. In this way, the scattering parameter matrix of the passive echoes is represented.

In some possible implementations, the processor 420 is specifically configured to perform dimension reduction on the matrix G by using a preset algorithm, to obtain a matrix V with an order of m×k. Row vectors in the matrix V are respectively v0, v1, . . . , and v(m−1), and are used to respectively represent the in virtual user directions, to obtain the m virtual user directions.

In some possible implementations, the preset algorithm may be to perform singular value decomposition on the matrix G, to obtain $U*S*V^H$, and use first m row vectors in $V^H$ as the matrix V, where U is a unitary matrix with an order of m×m, S is a positive semidefinite diagonal matrix with an order of m×k, and $V^H$ is a unitary matrix with an order of k×k. Any one of the row vectors v0, v1, . . . , and v(m−1) in the obtained matrix V is a vector representing a spatial direction, and has both a length and a direction. The direction of the vector is used to represent the virtual user direction, and the length of the vector is used to represent the signal strength of the passive echo.

In some possible implementations, the processor 420 may be specifically configured to: determine a target spatial channel matrix H based on the n real user directions and the m virtual user directions, where $$H = \begin{pmatrix} Hr \\ V \end{pmatrix},$$

and Hr is a spatial channel matrix, with an order of m×k, used to represent the n real user directions; and form the target beam based on the matrix H. In this way, almost no impact is exerted on a traffic requirement while generation of an active echo is reduced.

The processor 420 is further specifically configured to: determine a target frequency band based on the traffic requirement, where the target frequency band is one of a plurality of frequency bands obtained by dividing a full frequency band based on a preset frequency band division manner; and obtain a scattering parameter matrix that is of the passive echoes in the antenna system and that is formed at the target frequency band, to adapt to a frequency response characteristic, namely, a characteristic indicating that the scattering parameter matrix of the passive echoes varies with a frequency, of the passive echoes.

Figures 1, 2, 3, 4, 5:
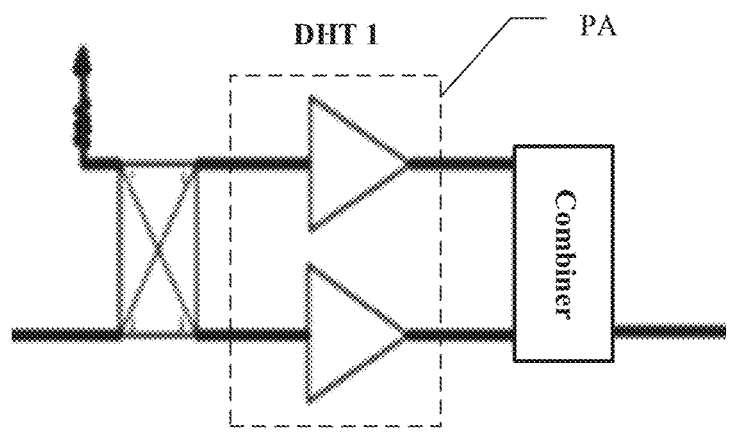
Figures 1, 2, 3, 4, 5, 6:
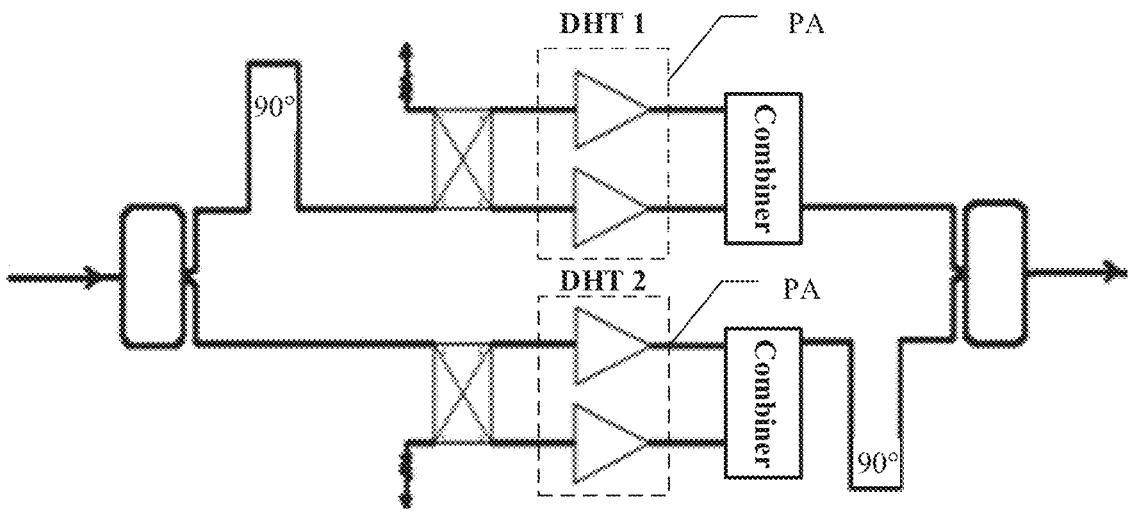
Figure 2:
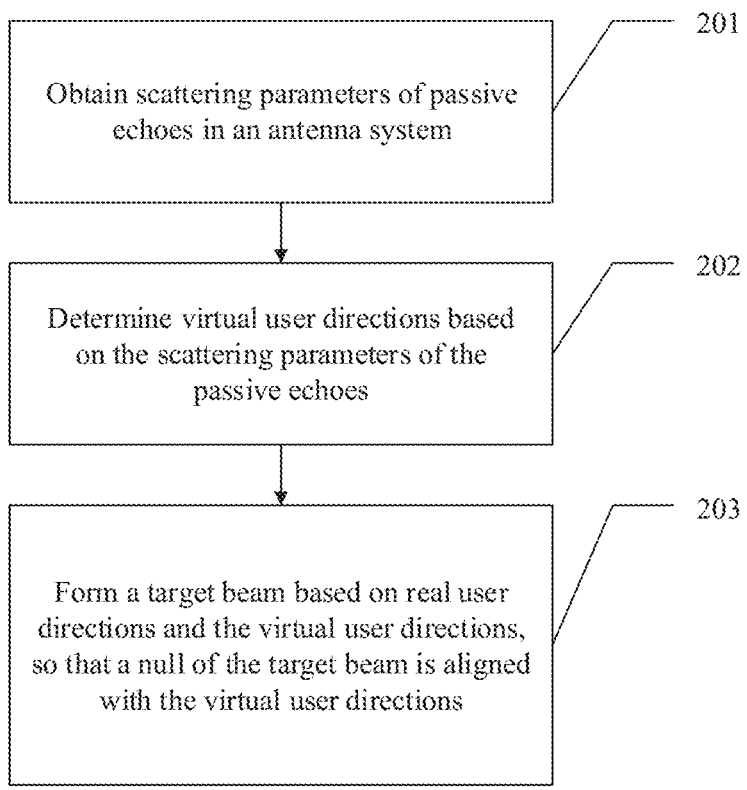
Figures 1, 3:
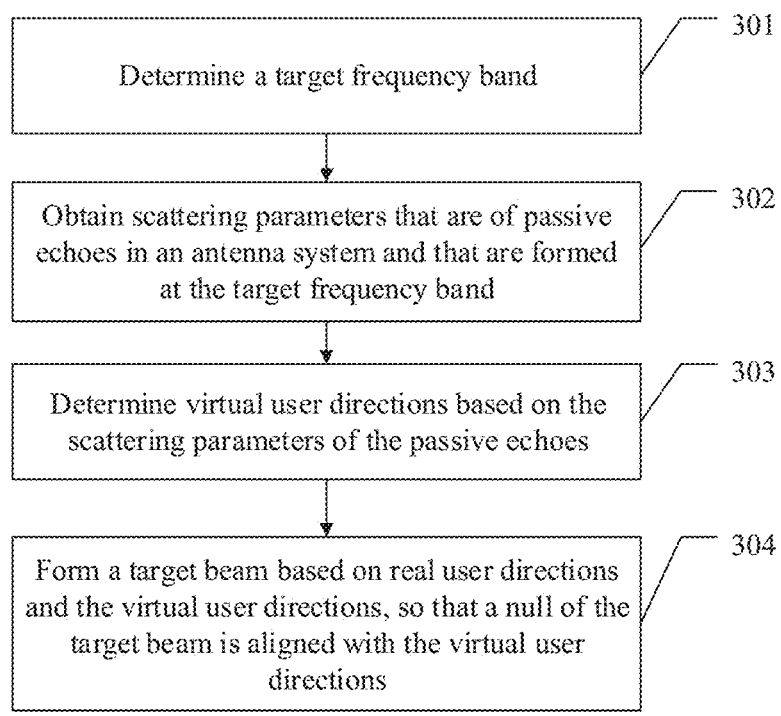
Figures 2, 3:
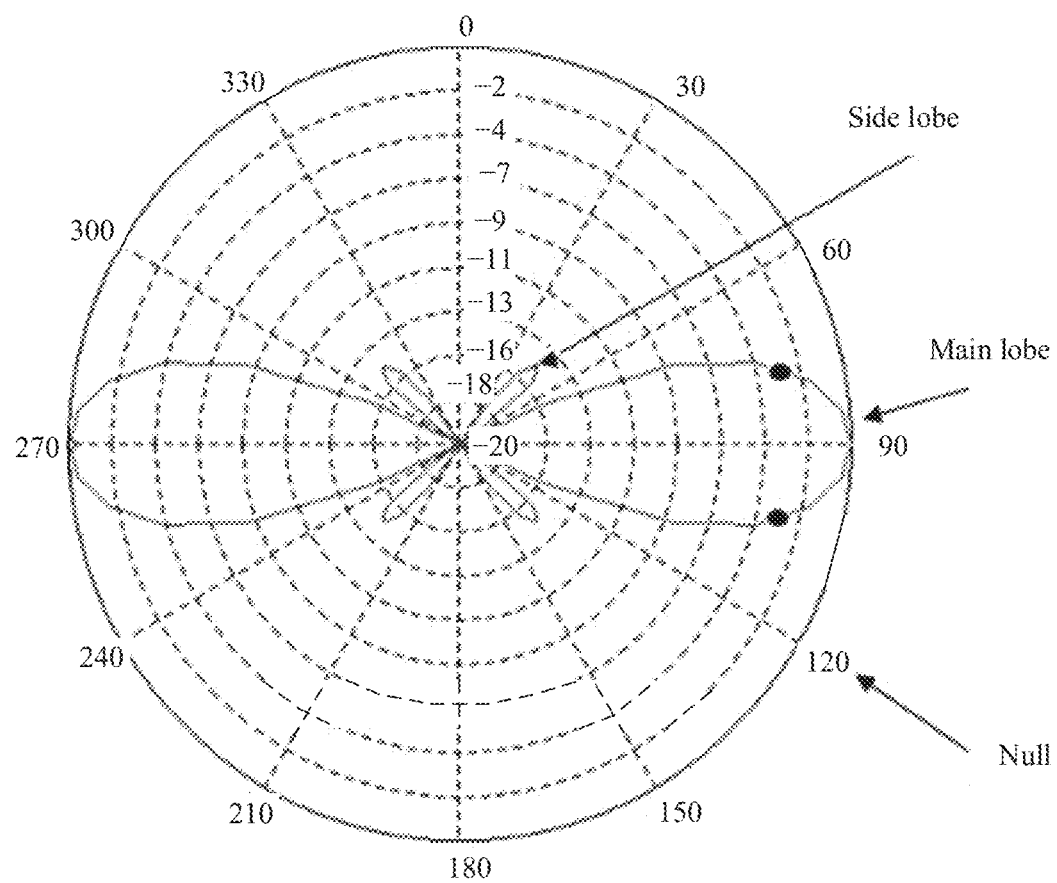
Figure 3:
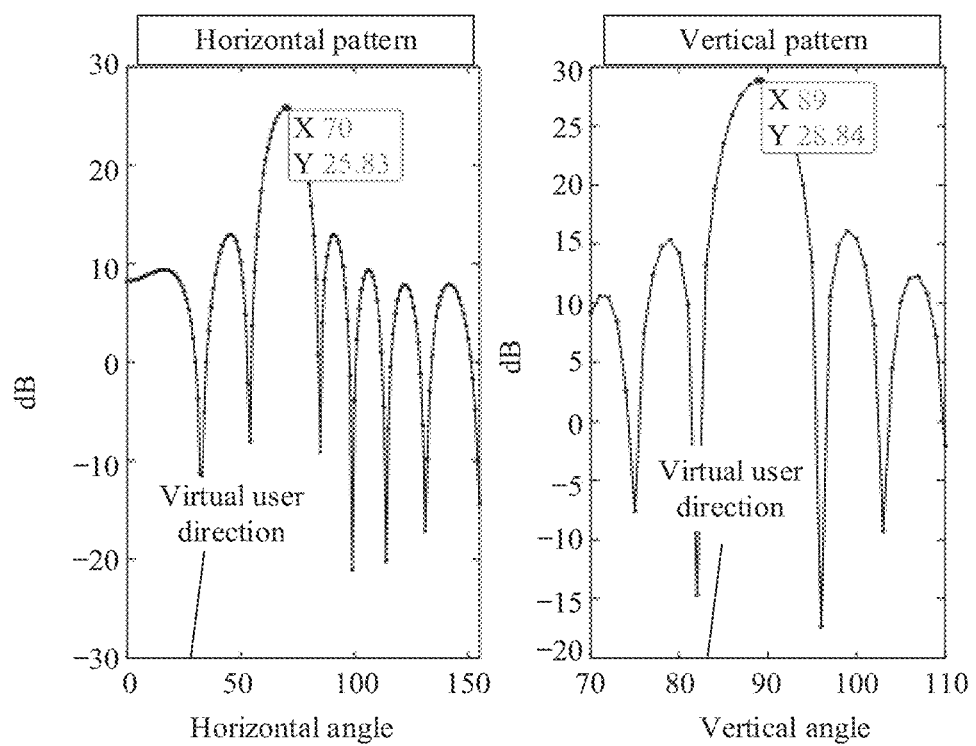
Figures 3, 4:
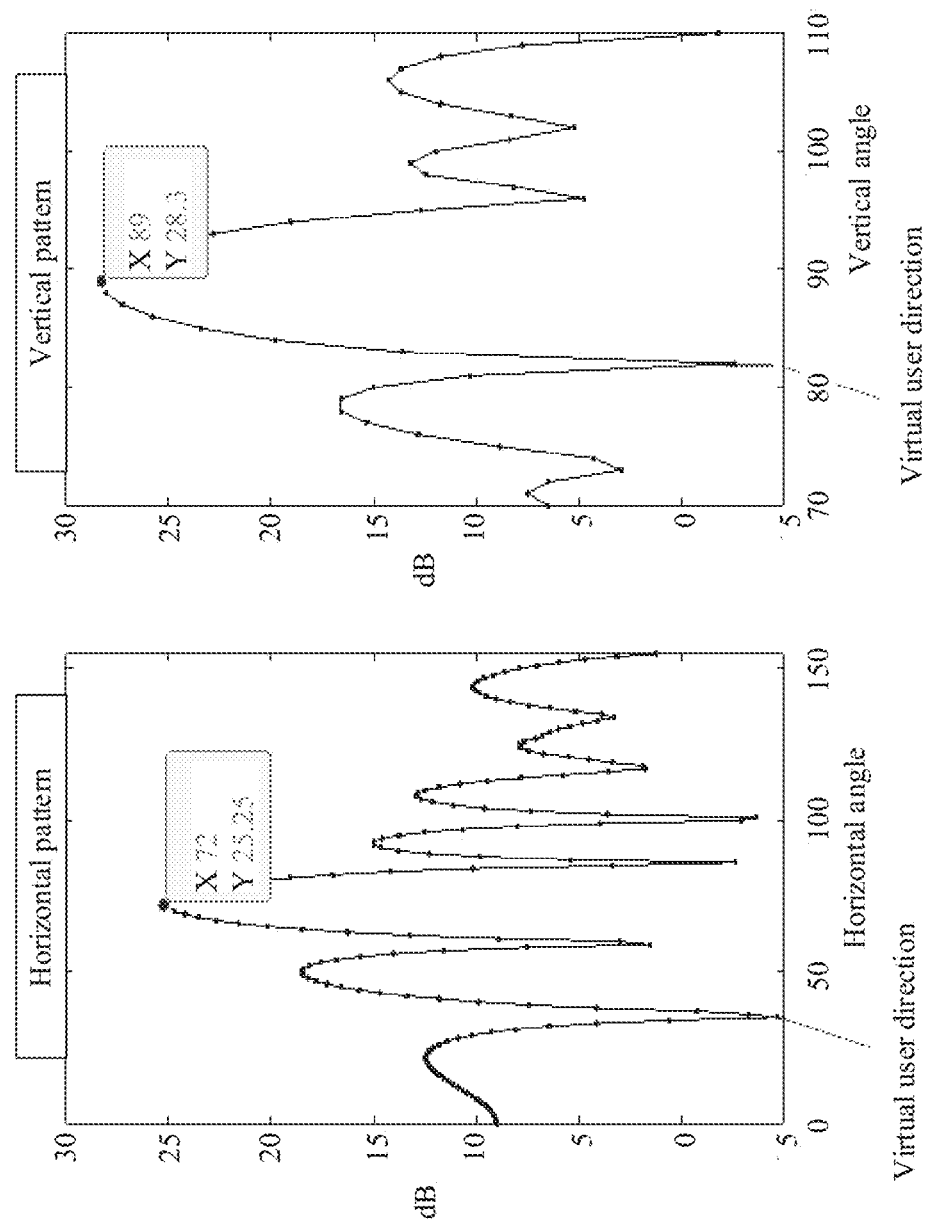
Figures 3, 4, 5:
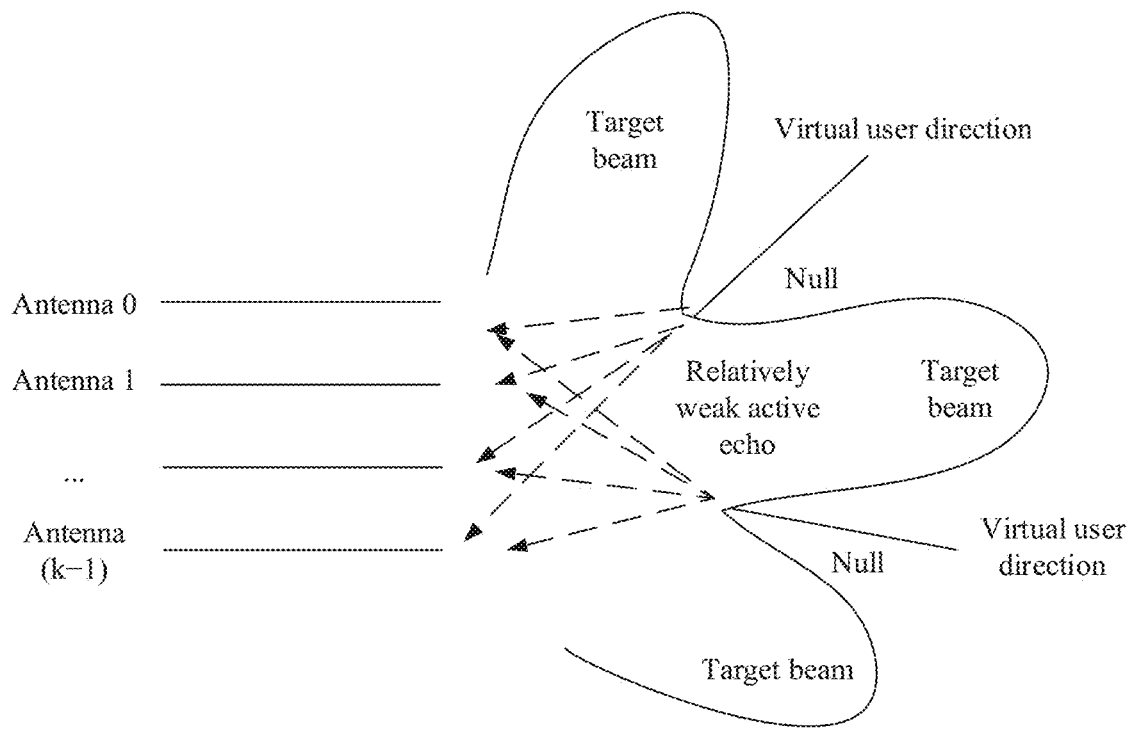
Figure 4:
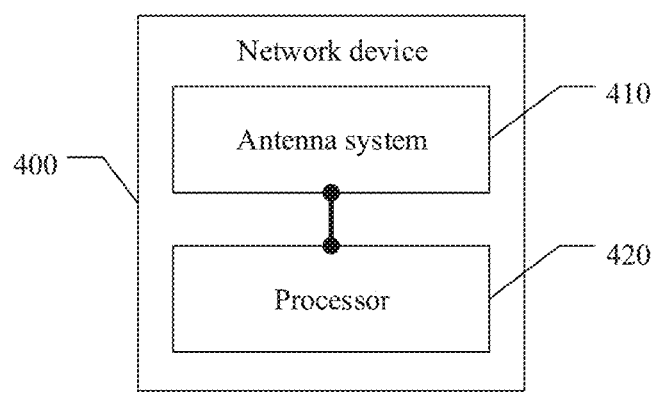
Figures 1, 5:
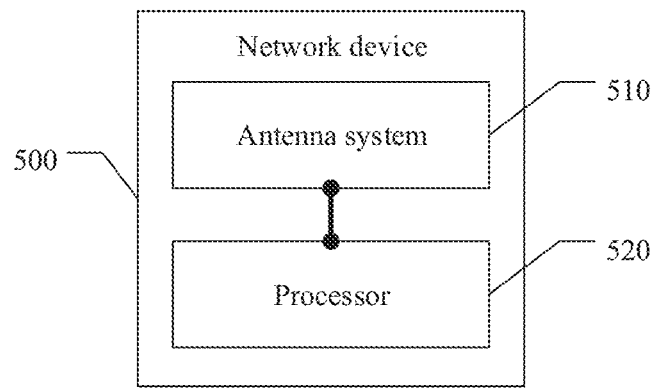
Figures 2, 5:
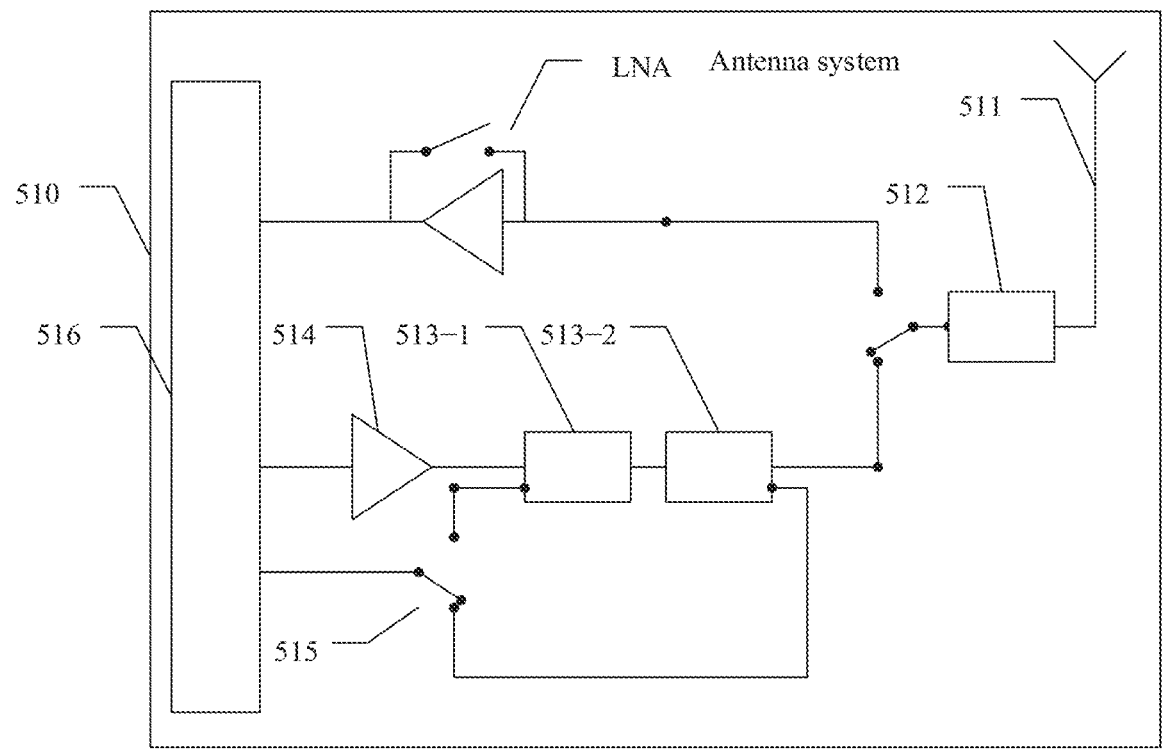
Figures 3, 5:
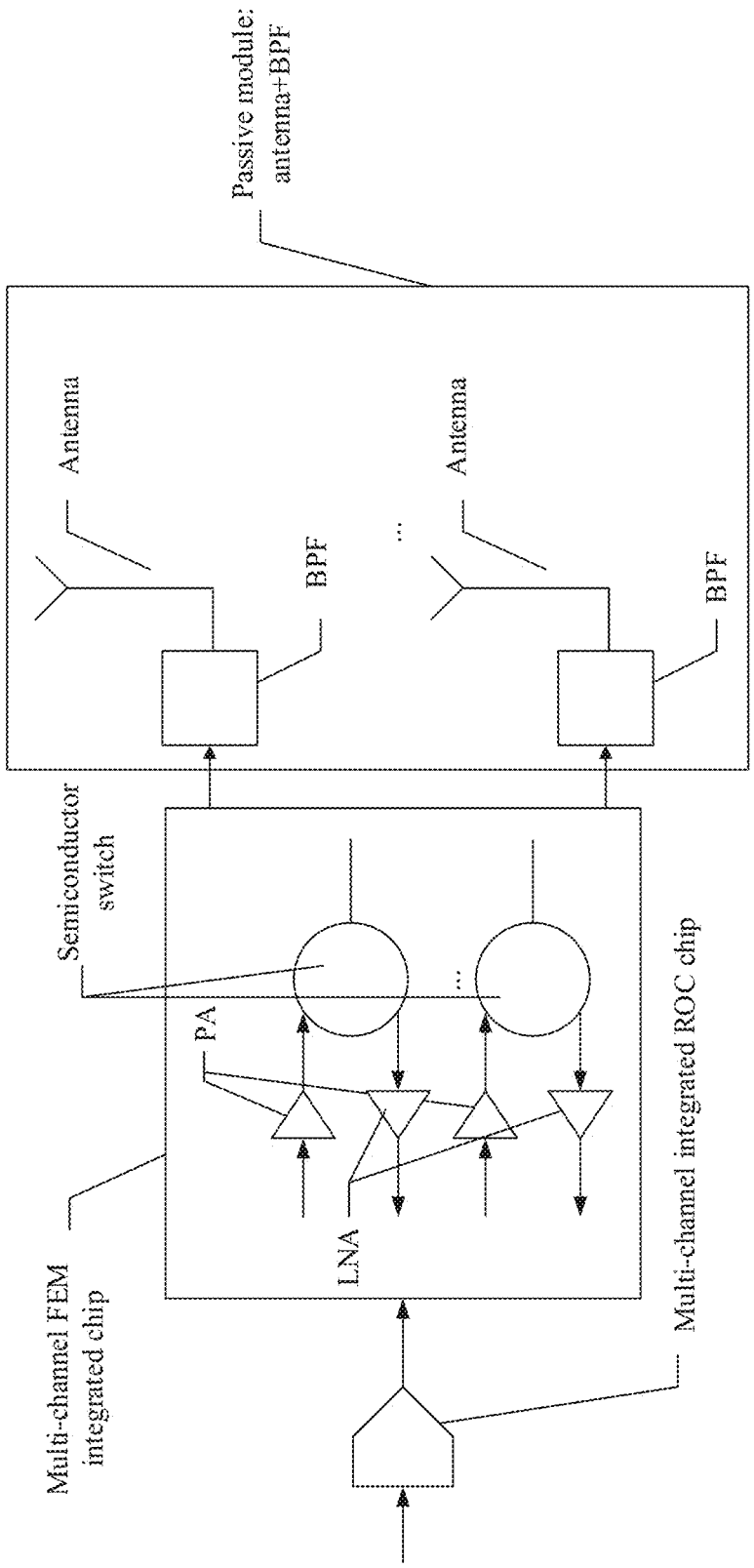

As shown in FIG. 5-1, an embodiment of this application further provides a network device 500, including an antenna system 510 and a processor 520.

The antenna system 510 is configured to send and receive a signal.

The processor 520 is configured to: obtain a scattering parameter matrix of passive echoes in the antenna system, where the antenna system includes k antennas, and k is a positive integer; determine in virtual user directions based on the scattering parameter matrix of the passive echoes, where the m virtual user directions are m directions in which total signal strength of the passive echoes is highest, and in is a positive integer; and form a target beam based on n real user directions and the m virtual user directions, where a null of the target beam is aligned with the m virtual user directions, n is a positive integer, and n+m≤k. In this way, generation of an active echo is reduced, and therefore no circulator is needed in the antenna system in the network device, to reduce a volume of the antenna system, so that the antenna system can be further integrated.

In some possible implementations, as shown in FIG. 5-2, the antenna system 510 further includes an antenna 511, a filter 512, a first coupler 513-1, a second coupler 513-2, a PA 514, a coupler switch 515, and a radio transceiver apparatus 516. In some feasible embodiments, the antenna system 510 may further include an LNA.

The first coupler 513-1 and the second coupler 513-2 are sequentially disposed side by side in front of the PA 514 in a transmission direction of the antenna. The first coupler 513-1 communicates with the PA 514. The second coupler 513-2 communicates with the first coupler 513-1.

The coupler switch 515 communicates with the radio transceiver apparatus 516 for communicating with the second coupler 513-2 when the antenna 511 receives a signal.

It should be noted that a single coupler is used in a common antenna, is equivalent to the first coupler 513-1 in FIG. 5-2, and is configured to perform DPD correction on a forward signal. In this embodiment of this application, an additional coupler is added to form a dual coupler combination, namely, the first coupler 513-1 and the second coupler 513-2.

When the antenna 511 receives the passive echo, the coupler switch 515 is turned to the second couplers 513-2, so that a signal received by the antenna 511 is directed to the radio transceiver apparatus 516 by using the coupler switch 515. When the antenna 511 sends a forward signal, the coupler switch 515 is turned to the first coupler 513-1, so that a forward signal output by the PA 514 is received by the radio transceiver apparatus 516. There is insufficient isolation of the coupler switch 515, and therefore a pure passive echo cannot be obtained through coupling. Therefore, in some feasible embodiments, a time interval for sending two forward signals may be increased, so that sending of the forward signal and receiving of the passive echo can be completely staggered in time, to obtain a pure passive echo. The passive echoes are then aligned with the forward signals, and then the scattering parameter matrix G of the echoes is solved based on a least squares group in frequency domain groups.

In this embodiment of this application, the network device obtains the scattering parameter matrix of the passive echoes in the antenna system; determines the m virtual user directions based on the scattering parameter matrix of the passive echoes; and finally forms, based on the n real user directions and the m virtual user directions, the target beam whose null is aligned with the virtual user directions. in this way, generation of an active echo is reduced, and therefore no circulator is needed in the antenna system in the network device, to reduce a volume of the antenna system, so that the antenna system can be further integrated.

Integration into a structure shown in FIG. 5-3 is implemented from a structure shown in FIG. 1-2, to reduce the volume of the antenna system 510, so that the antenna system can he further integrated. For example, a plurality of PAs 514 may be integrated into a multi-channel front-end module (FEM) integrated chip and a multi-channel integrated radio-on-a-chip (ROC), to integrate the PA 514 and the subsequent filter 512.

It should be noted that the antenna 511 is a converter, is a component, in a radio device, for transmitting or receiving an electromagnetic wave, and is configured to: convert a guided wave that is propagated on a transmission line into an electromagnetic wave that is propagated in an unbounded medium (usually free space), or perform opposite conversion. During transmission, the antenna 511 converts a high-frequency current into an electromagnetic wave, and radiates the electromagnetic wave in the air. During receiving, the antenna 511 receives an electromagnetic wave from the air, and converts the electromagnetic wave into a high-frequency current.

The processor 520 may further include a hardware chip. The hardware chip may be an application-specific integrated circuit (ASIC), a programmable logic device (PLD), a CPU, an RISC microprocessor (ARM), a digital signal processor (DSP), or a combination thereof. The PLD may be a complex programmable logic device (CPLD), a field-programmable gate array (FPGA), a generic array logic (GAL), or any combination thereof. In this embodiment of this application, steps performed by the processor 520 are the same as the steps in the method embodiment. Details are not described herein.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, software/hardware with a similar computer function, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) mariner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings, direct couplings, or communication connections may he implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods in the embodiments of this application. The storage medium includes any medium that can store program code, such as a USB flash drive, a removable hard disk, a read-only memory (ROM, Read-Only Memory), a random access memory (RAM, Random Access Memory), a diskette, or a compact disc.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof. Such modifications or replacements do not make the essence of the corresponding technical solutions depart from the scope of the technical solutions of the embodiments of this application.

What is claimed is:

1. A signal processing method, comprising:
    obtaining, by a network device, a scattering parameter matrix of passive echoes in an antenna system, wherein the antenna system comprises k antennas, and k is a positive integer;
    determining, by the network device, m virtual user directions based on the scattering parameter matrix of the passive echoes, wherein the m virtual user directions are m directions in which total signal strength of the passive echoes is highest, and m is a positive integer; and
    forming, by the network device, a target beam based on n real user directions and the m virtual user directions, wherein one or more nulls of the target beam are aligned with the m virtual user directions, n is a positive integer, and n+m≤k.

2. The method according to claim 1, wherein the scattering parameter matrix of the passive echoes is a matrix G with an order of k×k, a value in an $i^{th}$ row and a $j^{th}$ column in the matrix G is g(i, j), and g(i, j) is equal to a signal strength ratio between a passive echo received by an antenna in an $i^{th}$ column from an antenna in the $j^{th}$ column and a signal transmitted by the antenna in the $i^{th}$ column.

3. The method according to claim 2, wherein the determining, by the network device, m virtual user directions based on the scattering parameter matrix of the passive echoes comprises:

performing, by the network device, dimension reduction on the matrix G by using a preset algorithm, to obtain a matrix V with an order of m×k, wherein row vectors in the matrix V are respectively v0, v1, . . . , and v(m−1), and are used to respectively represent the m virtual user directions.

4. The method according to claim 3, wherein the performing, by the network device, dimension reduction on the matrix G by using a preset algorithm, to obtain a matrix V with an order of m×k comprises:

performing, by the network device, singular value decomposition on the matrix G, to obtain $U*S*V^H$, and using first m row vectors in $V^H$ as the matrix V, wherein U is a unitary matrix with an order of m×m, S is a positive semidefinite diagonal matrix with an order of m×k, and $V^H$ is a unitary matrix with an order of k×k.

5. The method according to claim 3, wherein the forming, by the network device, a target beam based on n real user directions and the m virtual user directions, wherein one or more nulls of the target beam are aligned with the m virtual user directions comprises:

determining, by the network device, a target spatial channel matrix H based on the n real user directions and the m virtual user directions, wherein $$H = \begin{pmatrix} Hr \\ V \end{pmatrix},$$

and Hr is a spatial channel matrix, with an order of m×k, used to represent the n real user directions; and forming, by the network device, the target beam based on the target spatial channel matrix H, wherein the one or more nulls of the target beam are aligned with the m virtual user directions.

6. The method according to claim 1, wherein the obtaining, by a network device, a scattering parameter matrix of passive echoes in an antenna system comprises:

determining, by the network device, a target frequency band based on a traffic requirement, wherein the target frequency band is one of a plurality of frequency bands obtained by dividing a full frequency band based on a preset frequency band division manner; and obtaining, by the network device, a scattering parameter matrix that is of the passive echoes in the antenna system and that is formed at the target frequency band.

7. An apparatus, comprising:

at least one processor and a memory storing instructions for execution by the at least one processor, wherein, when executed, the instructions cause the apparatus to perform operations comprising:

obtaining a scattering parameter matrix of passive echoes in an antenna system, wherein the antenna system comprises k antennas, and k is a positive integer;

determining m virtual user directions based on the scattering parameter matrix of the passive echoes, wherein the m virtual user directions are m directions in which total signal strength of the passive echoes is highest, and m is a positive integer; and forming a target beam based on n real user directions and the m virtual user directions, wherein one or more nulls of the target beam are aligned with the m virtual user directions, n is a positive integer, and n+m≤k.

8. The apparatus according to claim 7, wherein the scattering parameter matrix of the passive echoes is a matrix G with an order of k×k, a value in an $i^{th}$ row and a $j^{th}$ column in the matrix G is g(i, j), and g(i, j) is equal to a signal strength ratio between a passive echo received by an antenna in an $i^{th}$ column from an antenna in the $j^{th}$ column and a signal transmitted by the antenna in the $i^{th}$ column.

9. The apparatus according to claim 8, wherein the determining m virtual user directions based on the scattering parameter matrix of the passive echoes comprises:

performing dimension reduction on the matrix G by using a preset algorithm, to obtain a matrix V with an order of m×k, wherein row vectors in the matrix V are respectively v0, v1, . . . , and v(m−1), and are used to respectively represent the m virtual user directions.

10. The apparatus according to claim 9, wherein the performing dimension reduction on the matrix G by using a preset algorithm, to obtain a matrix V with an order of m×k comprises:

performing singular value decomposition on the matrix G, to obtain $U*S*V^H$, and using first m row vectors in $V^H$ as the matrix V, wherein U is a unitary matrix with an order of m×m, S is a positive semidefinite diagonal matrix with an order of m×k, and $V^H$ is a unitary matrix with an order of k×k.

11. The apparatus according to claim 9, wherein the forming a target beam based on n real user directions and the m virtual user directions, wherein one or more nulls of the target beam are aligned with the m virtual user directions comprises:

determining a target spatial channel matrix H based on the n real user directions and the m virtual user directions, wherein $$H = \begin{pmatrix} Hr \\ V \end{pmatrix},$$

and Hr is a spatial channel matrix, with an order of m×k, used to represent the n real user directions; and forming the target beam based on the target spatial channel matrix H, wherein the one or more nulls of the target beam are aligned with the m virtual user directions.

12. The apparatus according to claim 7, wherein the obtaining a scattering parameter matrix of passive echoes in an antenna system comprises:

determining a target frequency band based on a traffic requirement, wherein the target frequency band is one of a plurality of frequency bands obtained by dividing a full frequency band based on a preset frequency band division manner; and obtaining a scattering parameter matrix that is of the passive echoes in the antenna system and that is formed at the target frequency band.

13. A non-transitory memory storage medium comprising computer-executable instructions that, when executed, carrying out operations comprising:

obtaining a scattering parameter matrix of passive echoes in an antenna system, wherein the antenna system comprises k antennas, and k is a positive integer;

determining m virtual user directions based on the scattering parameter matrix of the passive echoes, wherein the m virtual user directions are m directions in which total signal strength of the passive echoes is highest, and m is a positive integer; and forming a target beam based on n real user directions and the m virtual user directions, wherein one or more nulls of the target beam are aligned with the m virtual user directions, n is a positive integer, and n+m≤k.

14. The non-transitory memory storage medium according to claim 13, wherein the scattering parameter matrix of the passive echoes is a matrix G with an order of k×k, a value in an $i^{th}$ row and a $j^{th}$ column in the matrix G is g(i, j), and g(i, j) is equal to a signal strength ratio between a passive echo received by an antenna in an $i^{th}$ column from an antenna in the $j^{th}$ column and a signal transmitted by the antenna in the $i^{th}$ column.

15. The non-transitory memory storage medium according to claim 14, wherein the determining m virtual user directions based on the scattering parameter matrix of the passive echoes comprises:

performing dimension reduction on the matrix G by using a preset algorithm, to obtain a matrix V with an order of m×k, wherein row vectors in the matrix V are respectively v0, v1, . . . , and v(m−1), and are used to respectively represent the m virtual user directions.

16. The non-transitory memory storage medium according to claim 15, wherein the performing dimension reduction on the matrix G by using a preset algorithm, to obtain a matrix V with an order of m×k comprises:

performing singular value decomposition on the matrix G, to obtain $U*S*V^H$ and using first m row vectors in $V^H$ as the matrix V, wherein U is a unitary matrix with an order of m×m, S is a positive semidefinite diagonal matrix with an order of m×k, and $V^H$ is a unitary matrix with an order of k×k.

17. The non-transitory memory storage medium according to claim 15, wherein the forming a target beam based on n real user directions and the m virtual user directions, wherein one or more nulls of the target beam are aligned with the m virtual user directions comprises:

determining a target spatial channel matrix H based on the n real user directions and the m virtual user directions, wherein $$H = \begin{pmatrix} Hr \\ V \end{pmatrix},$$

and Hr is a spatial channel matrix, with an order of m×k, used to represent the n real user directions; and forming the target beam based on the target spatial channel matrix H, wherein the one or more nulls of the target beam are aligned with the m virtual user directions.

18. The non-transitory memory storage medium according to claim 13, wherein the obtaining a scattering parameter matrix of passive echoes in an antenna system comprises:

determining a target frequency band based on a traffic requirement, wherein the target frequency band is one of a plurality of frequency bands obtained by dividing a full frequency band based on a preset frequency band division manner; and obtaining a scattering parameter matrix that is of the passive echoes in the antenna system and that is formed at the target frequency band.

* * * * *

UNITED STATES PATENT AND TRADEMARK OFFICE
CERTIFICATE OF CORRECTION

PATENT NO. : 11,991,534 B2
APPLICATION NO. : 17/752308
DATED : May 21, 2024
INVENTOR(S) : Jie Feng and Yiwei Hong It is certified that error appears in the above-identified patent and that said Letters Patent is hereby corrected as shown below:

In the Claims

In Column 23, In Line 33 (approx.), In Claim 16, after "$U*S*V^H$" INSERT -- , --.

Signed and Sealed this
Twenty-ninth Day of October, 2024

Katherine Kelly Vidal
*Director of the United States Patent and Trademark Office*